(12) United States Patent
Perdue (10) Patent No.: US 7,423,549 B2
(45) Date of Patent: Sep. 9, 2008

(54) DIGITAL CONTROL CIRCUIT FOR SERIAL UART TRANSMISSIONS

(75) Inventor: Kenneth Lee Perdue, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 370 days.

(21) Appl. No.: 10/510,894

(22) PCT Filed: Apr. 4, 2003

(86) PCT No.: PCT/US03/10400

§ 371 (c)(1),
(2), (4) Date: Oct. 8, 2004

(87) PCT Pub. No.: WO03/088568

PCT Pub. Date: Oct. 23, 2003

(65) Prior Publication Data

US 2005/0169352 A1     Aug. 4, 2005

Related U.S. Application Data

(60) Provisional application No. 60/371,983, filed on Apr. 12, 2002.

(51) Int. Cl.
G08C 19/00 (2006.01)
(52) U.S. Cl. .................. 340/825.72; 398/111; 398/175; 725/151; 375/147
(58) Field of Classification Search ................. 375/147, 375/220; 370/276, 282, 296, 438; 725/86.105
See application file for complete search history.

(56) References Cited

U.S. PATENT DOCUMENTS

| | | | | | |
|---|---|---|---|---|---|
| 5,093,921 | A | * | 3/1992 | Bevins, Jr. ................... | 725/152 |
| 5,355,480 | A | * | 10/1994 | Smith et al. .................. | 715/718 |
| 5,469,206 | A | * | 11/1995 | Strubbe et al. ................ | 725/60 |
| 5,517,257 | A | | 5/1996 | Dunn et al. | |
| 5,606,443 | A | * | 2/1997 | Sgambati ..................... | 398/111 |
| 5,657,072 | A | * | 8/1997 | Aristides et al. .............. | 725/46 |

(Continued)

FOREIGN PATENT DOCUMENTS

JP    A-2000115131    4/2000

(Continued)

OTHER PUBLICATIONS

Search Report date Oct. 10, 2003.

*Primary Examiner*—David C. Payne
*Assistant Examiner*—Leon Flores
(74) *Attorney, Agent, or Firm*—Joseph J. Laks; Robert D. Shedd; Reitseng Lin (57) ABSTRACT

A digital control circuit enables/disables the feedback of serial transmissions of an UART receive signal when the G-LINK output port is short circuited in a particular operational mode. In a conventional operational mode, the digital control circuit monitors the state of the UART's Tx output and during an UART transmission, the Rx line normally is used for statistics feedback to set to a high state and eliminate unnecessary or unwarranted UART interrupts generated by the G-LINK circuit. The digital control circuit thus enables the G-LINK signal feedback to the UART when required, thereby maintaining a functionality to identify the unit's operational mode and allows the serial ports of the G-LINK to be configured and utilized during conventional operational modes.

20 Claims, 5 Drawing Sheets

U.S. PATENT DOCUMENTS

| | | | |
|---|---|---|---|
| 5,671,225 | A | 9/1997 | Hooper et al. |
| 5,677,708 | A | 10/1997 | Matthews, III et al. |
| 5,717,715 | A * | 2/1998 | Claydon et al. ............. 375/220 |
| 5,781,228 | A | 7/1998 | Sposato |
| 5,812,931 | A * | 9/1998 | Yuen ........................... 725/123 |
| 5,815,145 | A | 9/1998 | Matthews, III |
| 5,815,297 | A * | 9/1998 | Ciciora ........................ 398/112 |
| 5,835,864 | A * | 11/1998 | Diehl et al. .................. 725/140 |
| 5,844,620 | A | 12/1998 | Coleman et al. |
| 5,861,906 | A | 1/1999 | Dunn et al. |
| 5,862,354 | A * | 1/1999 | Curiger et al. ............... 710/110 |
| 5,880,768 | A | 3/1999 | Lemmons et al. |
| 5,887,034 | A | 3/1999 | Suzuki |
| 5,914,746 | A * | 6/1999 | Matthews et al. ........... 725/132 |
| 5,987,213 | A * | 11/1999 | Mankovitz et al. ........... 386/83 |
| 6,016,144 | A | 1/2000 | Blonstein et al. |
| 6,128,117 | A * | 10/2000 | Kim ........................... 398/115 |
| 6,133,909 | A | 10/2000 | Schein et al. |
| 6,133,962 | A | 10/2000 | Proehl et al. |
| 6,151,059 | A | 11/2000 | Schein et al. |
| 6,175,362 | B1 | 1/2001 | Harms et al. |
| 6,188,702 | B1 | 2/2001 | Tometta et al. |
| 6,204,885 | B1 | 3/2001 | Kwoh |
| 6,229,524 | B1 | 5/2001 | Chernock et al. |
| 6,314,479 | B1 | 11/2001 | Frederick et al. |
| 6,321,382 | B1 * | 11/2001 | Wugofski ...................... 725/59 |
| 6,335,736 | B1 | 1/2002 | Wagnet et al. |
| 6,367,079 | B1 * | 4/2002 | De Vos et al. ................. 725/86 |
| 6,469,742 | B1 * | 10/2002 | Trovato et al. ............... 348/553 |
| 6,481,013 | B1 * | 11/2002 | Dinwiddie et al. ............ 725/80 |
| 6,483,616 | B1 * | 11/2002 | Maddocks et al. ............... 398/1 |
| 6,639,513 | B2 * | 10/2003 | Olsen et al. ............... 340/568.1 |
| 6,667,964 | B1 | 12/2003 | Seki et al. |
| 2001/0013131 | A1 * | 8/2001 | Wang ........................ 725/100 |
| 2001/0037423 | A1 | 11/2001 | Conway et al. |
| 2002/0034197 | A1 | 3/2002 | Tometta et al. |

FOREIGN PATENT DOCUMENTS

| | | |
|---|---|---|
| JP | A-2002009737 | 1/2002 |
| WO | WO 00/70867 | 11/2000 |
| WO | WO 01/02942 | 1/2001 |
| WO | WO-A-0189107 | 11/2001 |
| WO | WO-A-0229992 | 4/2002 |

* cited by examiner

| DIGITAL CONTROL CIRCUIT | | | | | | |
|---|---|---|---|---|---|---|
| MODE | CPLD CONTROL REGISTERS | | | CPLD DATA INPUTS | | UART INPUT | COMMENTS |
| | REGISTER6(4) | REGISTER6(2) | REGISTER14(3) | GLNK_Tx | GLNK_Rx | UART INPUT | COMMENTS |
| SETUP # | | | | | | UART_Rx | |
| 1 (MODE 1) | 0 | 0 | 1 | 1 | X | = GLNK_Rx | DEFAULT SETTING |
| 2 (MODE 1) | 0 | 0 | 1 | 0 | X | LOGIC 1 | DEFAULT SETTING |
| 3 (MODE 1) | 0 | 0 | 0 | X | X | LOGIC 1 | IR BLASTER ACTIVE |
| 4 (MODE 2) | 0 | 1 | 0 | X | X | = GLNK_Rx | CONFIGURATION TEST MODE |
| 5 (MODE 3) | 1 | X | X | X | X | LOGIC 1 | DETECTED DEMO PIN |

X: DON'T CARE IF LEVEL IS LOGIC HIGH OR LOW

DIGITAL CONTROL CIRCUIT FOR SERIAL UART TRANSMISSIONS

This application claims the benefit, under 35 U.S.C. § 365 of International Application PCT/US03/10400, filed Apr. 4, 2003, which was published in accordance with PCT Article 21(2) on Oct. 23, 2003 in English and which claims the benefit of U.S. Provisional patent application No. 60/371, 983, filed Apr. 12, 2002.

FIELD OF THE INVENTION

The present invention relates to control circuits in television set-top boxes, and more particularly, to a feedback control circuit.

BACKGROUND

In order to achieve high-speed packet transmission, a gigabit rate transmit/receive chip set (transceiver) must be employed. One such transceiver is a device sold by the Hewlett Packard Company headquartered in Palo Alto, Calif., USA, which makes and sells a transmitter designated as the HDMP-1022 transmitter and a receiver designated as the HDMP-1024 receiver. The HDMP-1022 transmitter and HDMP-1024 receiver chip set is described in detail in a 40-page Preliminary Technical Data sheet dated August 1996, distributed by Hewlett Packard and, at present, has been available on its Internet website. This data sheet shows how the HDMP-1022 transmitter and the HDMP-1024 receiver can be utilized as a gigabit, or G-LINK™ controller, to provide transmit and receive G-LINK serial interface operations. The G-LINK of the present invention is an upgraded G-LINK II.

Figure 1:
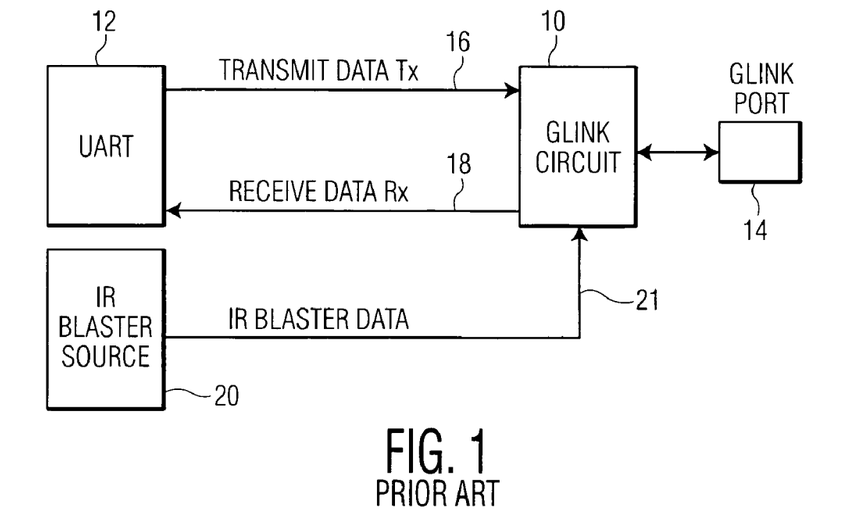
FIG. 1 depicts a prior art circuit arrangement using a G-LINK circuit, a G-LINK serial port, a UART, and an IR blaster source in a set-top box.

An application of a G-LINK controller is shown in FIG. 1, which can be used in a set-top box. In the figure, a G-LINK circuit 10 serves as a serial interface circuit for coupling a conventional universal asynchronous receiver-transmitter (UART) circuit 12 to a G-LINK serial port 14 for a plurality of purposes, such as providing the UART 12 with a signal path and controls for converting from full duplex to half duplex communication to and from the G-LINK serial port 14. In addition, the G-LINK circuit 10 may relay infrared (IR) signals received from IR blaster source 20 via data line 21 for the G-LINK serial port 14 to drive an IR blaster (not shown).

All the components in FIG. 1 are controllable by an operating system (not shown) and the UART 12 is defined as a COM port. As such, when the UART 12 receives a signal, it generates an interrupt signal to be processed by the operating system. In one mode of operation such as in a configuration test mode wherein the configuration of the system is tested, the G-LINK circuit 10 forwards a test signal from the G-LINK serial port 14 to the UART 12. Under this mode of operation, the UART 12 should receive the test signal and generate interrupts accordingly. However, in another mode of operation, such as in a demonstration mode wherein a user is educated on the use and capabilities of the system, the G-LINK circuit 10 unnecessarily transmits signals it receives from the UART 12 back to the UART 12. This unnecessary feedback causes the UART 12 to generate unnecessary interrupts to be served by the operating system. The processing of these unnecessary interrupts may degrade the performance of the set-top box. Thus, there is a need to control the communication between the G-LINK circuit and the UART 12.

SUMMARY OF THE INVENTION

According to the principles of the invention, a digital control circuit (DCC) enables/disables signals transmitted from a second circuit (such as a G-LINK circuit) to an input/output device (such as an universal asynchronous receiver/transmitter (UART)). In addition to transmitting signals to the input/output device, the second circuit also receives signals transmitted from the input/output device. The DCC may control the signals transmitted from the second circuit according to the signals transmitted by the input/output device to the second circuit. For example, when the input/output device is transmitting signals to the second circuit, the DCC inhibits signals transmitted from the second circuit to the input/output device. This way, the input/output device does not receive any signals from the second device and thus does not generate interrupts to a central processing unit (CPU).

In one embodiment, the second circuit is a G-LINK circuit having a bi-directional line coupled to a G-LINK port, and the input/output device is a UART. When the G-LINK port is short-circuited in a particular operational mode, the DCC prevents signal transmissions from the G-LINK circuit to the UART. In another operational mode, the DCC monitors the state of the UART's output and during UART transmission, the DCC sets a high state on the receive line of the UART, indicating no incoming signals and thus preventing unnecessary or unwarranted UART interrupts from being generated by signals coming from the G-LINK circuit. In yet another operation mode, the DCC allows free flow of signals to be transmitted from the G-LINK circuit to the UART. The DCC thus enables the G-LINK signal feedback to the UART when required.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
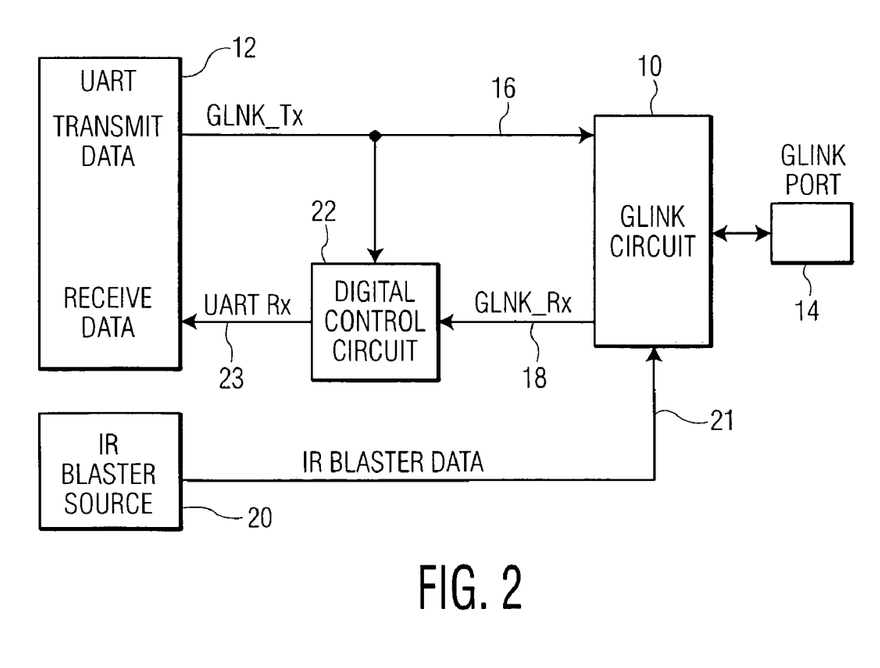
FIG. 2 depicts a circuit arrangement according to the principles of the invention for controlling communications between the G-LINK circuit transmit line and the UART receive line.

FIG. 2 illustrates an exemplary circuit arrangement according to the principles of the invention. A G-LINK circuit 10 serves as a serial interface circuit for coupling a conventional universal asynchronous receiver-transmitter (UART) circuit 12, e.g., a portion of a TL811 integrated circuit made by TeraLogic Inc. headquartered in Mountain View Calif., USA, to a G-LINK serial port 14 for a plurality of purposes, e.g., to provide the UART 12 with a signal path and controls for converting from full duplex to half duplex communication to and from G-LINK serial port 14, or to provide a signal path directly from the UART 12 to the G-LINK serial port 14 for full duplex communications, for further design improvements or for troubleshooting purposes. A digital control circuit (DCC) 22 is disposed between an output line (GLNK_Rx 18) of the G-LINK circuit 10 and a receive (input) line (UART_Rx 23) of the UART 12 for controlling the signals transmitted from the G-LINK circuit 10 to the UART 12 according to the activity present at GLNK_Tx 16 (the output line of the UART 12 or the input line of G-LINK circuit 10) and other factors discussed below.

Additionally, the present arrangement is used for the G-LINK serial port 14 to drive an infrared (IR) blaster (not shown) in response to an IR blaster source 20 via an IR blaster data line 21 coupled to G-LINK circuit 10 as shown in FIG. 2. The IR blaster is an infrared light emitting diode (LED), disposed outside of the set-top box, for controlling an external device (not shown) which can be remotely controllable by IR signals, e.g., a VCR, television receiver, DVD player, etc. The use of an IR blaster for such a purpose is known to those skilled in the art. The IR blaster source 20 is driven by a complex programmable logic device (CPLD) (not shown) and is discussed more fully below.

The circuit arrangement in FIG. 2 can also be used in a manner where paging control commands can be transmitted from the UART 12 to G-LINK serial port via the G-LINK circuit 14 for controlling an external pager module to establish a connection with a paging service provider. This circuit arrangement has been used in the ATC311 high definition televisions provided by Thomson Inc., Indianapolis, Ind., USA.

The invention is particularly suitable for use in a set-top box (not shown) for a television receiver (not shown). Only those portions of the set-top box and/or the television receiver necessary for understanding the present invention are further discussed below. For example, the set-top box has an operating system, which in the present case is Windows CE™, a product of the Microsoft Corp. headquartered in Redmond Wash., USA, and a central processing unit (CPU) (not shown) both of which control the UART 12, the G-LINK circuit 10 and the DCC 22 discussed below. When the UART 12 receives a signal, the UART 12 generates an interrupt signal, which normally requires the operating system to jump to an interrupt handler to process the interrupt. Other input/output or receiver-transmitter devices such a universal synchronous/asynchronous transmitter-receiver (USART) may be used in this circuit arrangement as well.

The circuit arrangement in FIG. 2 operates under several modes of operation. In a configuration test mode of operation, the DCC 22 allows all the signals transmitted from the G-LINK circuit 10 to be delivered to the UART 12. In a demonstration mode, the DCC 22 disables any signals transmitted from the G-LINK circuit 10 to the UART 12. The operating system should not place the set-top box in the demonstration mode unless the operating system detects that the G-LINK serial port 14 is short-circuited, which is an indication from a user that the user wants the set-top box to enter the demonstration mode. When the G-LINK serial port 14 is short-circuited, the G-LINK circuit 10 generally returns any signals that it receives from the UART 12. Thus, to detect whether the G-LINK serial port is short-circuited, the operating system may place the set-top box in the configuration test mode, send a test signal to the G-LINK circuit 10 through the UART 12, and wait to see if the test signal returns from the UART 12. If the test signal returns, the operating system determines that the G-LINK serial port has been short-circuited and may proceed to place the set-top box in the demonstration mode. Short-circuiting the G-LINK serial port 14 can be achieved by shorting the plug, thereby shorting the data signal line to ground.

When the G-LINK serial port 14 is not short-circuited, the set-top box normally is operating under a default mode, in which a tester by using test equipment is able to send debug messages from the UART 12 to G_LINK serial port 14. Under the default mode of operation, the G-LINK circuit 10 sends back signals it receives from the UART 12, which is unnecessary. To eliminate or mask interrupts generated by these returned signals, the DCC 22 monitors the state of the UART output line GLNK_Tx 16 and during UART 12 transmission, the UART receive line UART_Rx 23, is set to a high state, indicating to the UART 12 that no signals have been received and blocking the signals coming from the G-LINK circuit 10.

When the G-LINK serial port 14 is not short-circuited, the operating system may also place the set-top box in an IR blaster mode. Under this mode, the G-LINK circuit 10 generally sends signals to the UART 12. These signals are unnecessary. As such, the DCC 22 disables any signals transmitted from the G-LINK circuit 10 via GLNK_Rx 18 to the UART 12, again eliminating unnecessary interrupts.

Figure 3A:
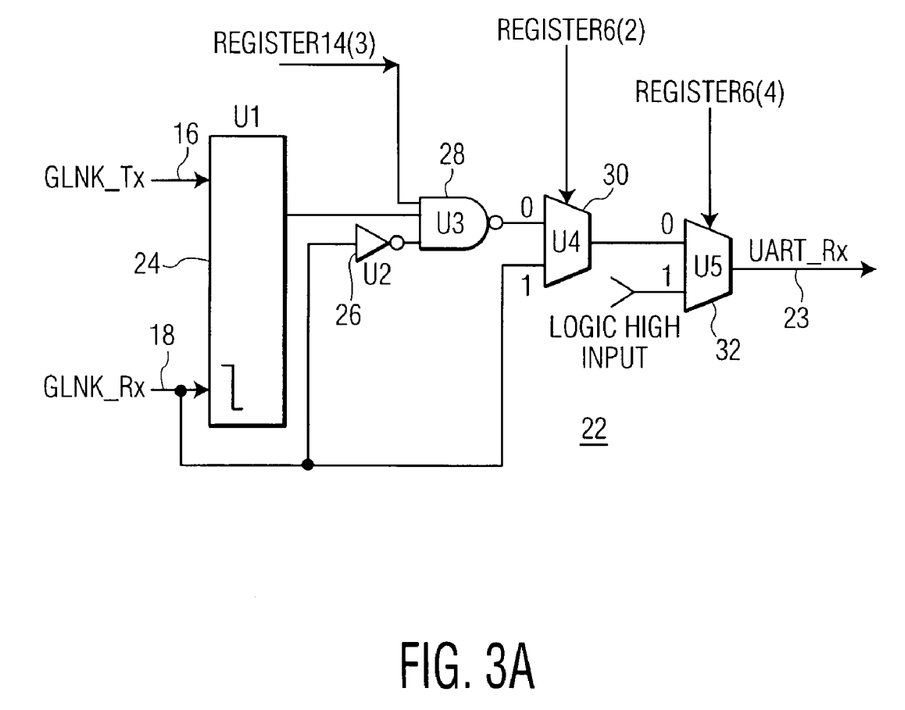
FIGS. 3A and 3B illustrate an exemplary digital control circuit used in the circuit arrangement shown in FIG. 2 and the setup arrangements for different modes of operation.
Figure 3B:
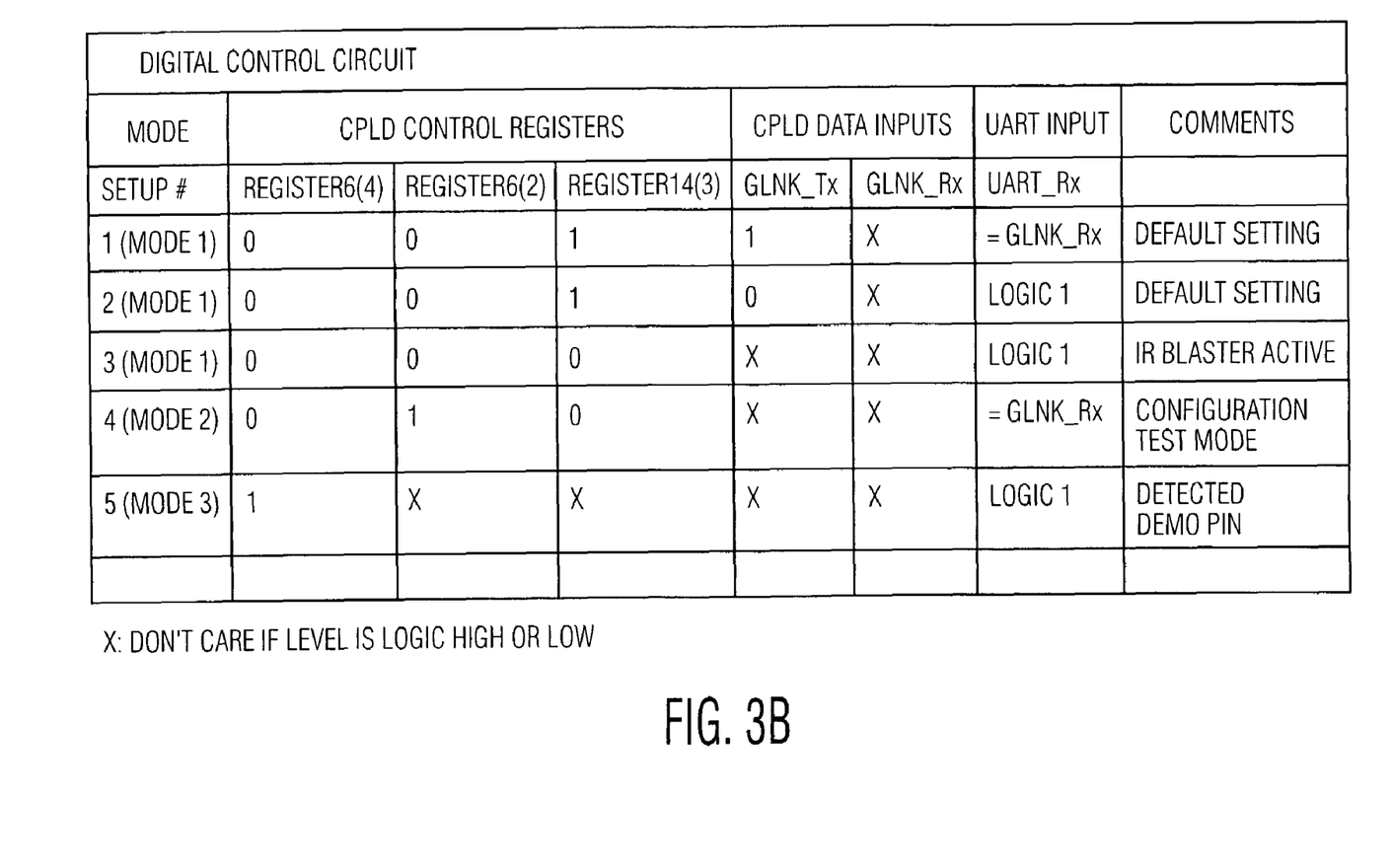

The DCC hardware logic and control registers are shown in FIG. 3A. The table of FIG. 3B shows the logical behavior for the DCC 22 for each control register's setting and corresponding data inputs. In FIGS. 3A and 3B, GLNK_Rx, GLNK_Tx, and UART_Rx represent logic (signal) states at GLNK_Rx 18, GLNK_Tx 16, and UART_Rx 23, respectively. FIG. 3A shows that DCC 22 comprises five devices U1 through U5. U1 24 is a sequentially clocked flip-flop functioning as a latch, U2 26 and U3 28 comprise common low level logic gates, and U4 30 and U5 32 are common signal multiplexers. The DCC 22 takes the following inputs to generate UART_Rx: GLNK_Tx, GLNK_Rx, register 4 bit 3, register 6 bit 2, and register 6 bit 4. Registers 4 and 6 are included in a complex programmable logic device (CPLD) (not shown) and are set by the operating system. In the following discussion, a logic value of 1 (high) generally means that no signals are transmitted. For example, when GLNK_Tx has a logic value of 1, it generally means that the GLNK_Tx 16 line is idle, i.e., not transmitting or receiving.

U4 30 and U5 32 multiplexers provide the G-LINK circuit 10 with three systems level operating modes. The simplest mode is the demonstration mode (setup number 5 or mode 3 in FIG. 3B) where the output of U5 32 is at a logic high level—UART_Rx has a logic value of 1, i.e., the UART_Rx 23 line is idle and thus the UART 12 does not receive any signal. This mode is actuated when U5 32 has a control signal from the CPLD with register 6 bit 4 being set to a logic level 1 as shown in the table of FIG. 3B.

When register 6 bit 4 is set to a logic low level, the DCC 22 operates in one of the other two modes, or one of setup numbers 1-4. The output of U5 32 directly depends on the output of U4 30 according to FIG. 3B. U4 multiplexer is controlled by the logic level of CPLD register 6 bit 2. When the logic level of CPLD register 6 bit 2 is high, the DCC 22 operates under the configuration test mode or mode 2. In this case, the output of U4 30 is just the signals coming from GLNK_Rx 18. See FIG. 3A. As such, the output signals at UART_Rx 23 are the same as those coming from GLNK_Rx 18. Thus, the DCC 22 enables the free flow of signals transmitted from the G-LINK circuit 10 to the UART 12. This is necessary because the test signals are generally transmitted through the G-LINK serial port 14 to the UART 12 to be processed by the operating system.

When CPLD register 6, bit 2 is set to a logic low level, the DCC 22 operates under mode 1. The output of U4 30 directly depends on the output of U3 28, which is a NAND gate having three inputs: CPLD register 14 bit 3, the signals coming from GLNK_Tx and the output signals from U2 26. U2 26 is an inverter for inverting signals coming from GLNK_Rx 18. A signal from GLNK_Tx 16 is latched at U1 24 when the signal from the GLNK_Rx 18 is transitioning from a logic value of 1 to 0. This latched state of G-LINK-Tx 16 eliminates false logic transitions at the output of U3 28 that may be due to phase or timing differences in the G-LINK_Rx 18 and G-LINK_Tx 16 signals.

Under mode 1, when CPLD register 14 bit 3 is set to a logic value of 1, the DCC 22 is in default operating condition. The DCC in this default operating condition checks whether the UART 12 is transmitting signals to the G-LINK circuit 10. If the UART 12 is not transmitting, the DCC 22 enables signals transmitted from the G-LINK circuit 10 to the UART 12. Otherwise, if the UART 12 is transmitting, the DCC 22 disables the signals transmitted from the G-LINK circuit 10. In FIGS. 3A and 3B, when the signals from GLNK_Tx 16 have a logic value of 1 (no signals), the output of U3 28 is the output of U2 26 or the signals coming from GLNK_Rx 18. In effect, the signals at UART_RX 23 are the same as those coming in at GLNK_Rx 18. On the other hand, if signals from GLNK_Tx 16 have a logic value of 0 (the UART 12 is transmitting), the output of U3 28 has a logic value of 1. In effect, the signals at UART_Rx 23 are held at a logic value of 1, disabling the transmission from the G-LINK circuit 10 to the UART 12.

Under mode 1, if CPLD register 14 bit 3 is set to a logic value of 0, the IR blaster is active, i.e., the G-LINK circuit 10 is receiving IR signals from the IR blaster source 20 and transmitting the IR signals to an external IR blaster via the G-LINK serial port 14. Under this situation, the output of U3 28 has a logic value of 1, which causes the signals at UART_Rx 23 to have a logic value of 1 as well, disabling the transmission from the G-LINK circuit 10 to the UART 12.

It should be understood that the specific level signals from the CPLD and signal levels stated in FIG. 3B are specific to the operating system used and associated circuitry, are exemplary and are presented to convey an understanding of the operation to one skilled in the art. The CPLD and its respective registers form no part of the present invention.

When a shorting plug is inserted into the G-LINK serial port 14, this short-circuiting of the output is sensed and the system is placed in the demonstration mode wherein the user is educated on the use and capabilities of the system. It is of course understood that equivalents of a shorting plug can be used, e.g., a front panel switch. This mode is typically utilized in a retail store for actuating a demonstration mode, and conforms to setup 5 of FIG. 3B. The operation of the demonstration mode forms no part of the present invention.

Figure 4:
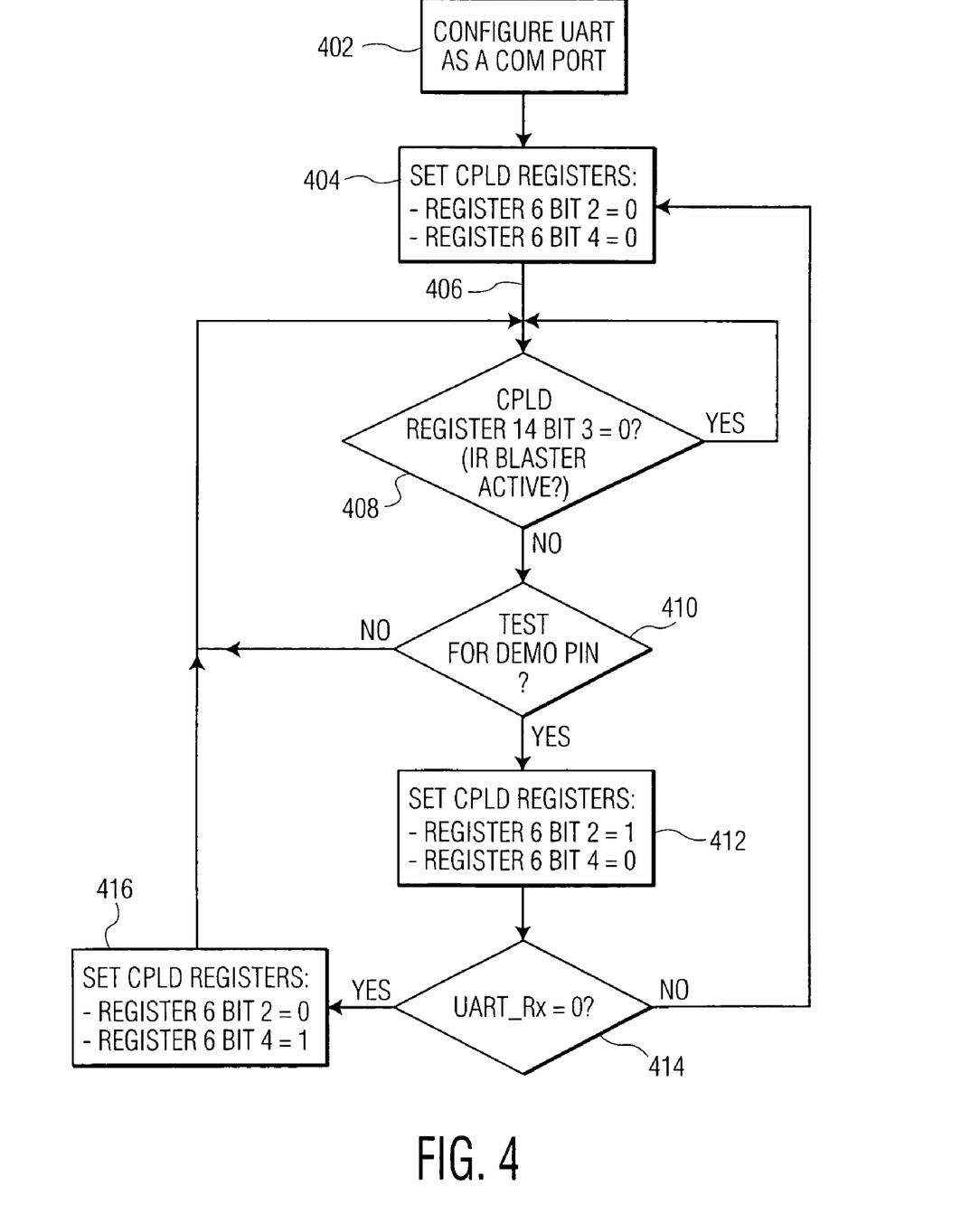
FIG. 4 illustrates a flowchart showing the steps for entering the demonstration mode under the control of the CPU and the operating system.

FIG. 4 shows a flowchart of entering the demonstration mode of operation under the control of the CPU and the operating system. When a user short-circuits the G-LINK serial port 14, the user is instructing the set-top box to enter the demonstration mode. At 402 the UART is configured as a COM port, an option provided for by the operating system. In the exemplary embodiment, the CPLD registers (not shown) are set at 404, where both bits 2 and 4 of the CPLD register 6 are set to zero, i.e., the set-top box is either in default or IR blaster mode. The process continues through link 406 to node 408 for a determination of whether the IR blaster is active. In this embodiment and as shown in FIG. 3B, if register 14 bit 3 is zero, then the IR blaster mode is active. If the IR blaster mode is active, there is a return to link 406. If "no", there is a determination at 410 of whether the operating system wants to test for whether the G-LINK serial port 14 is short-circuited (shown as "Test for DEMO PIN?") for providing a demonstration, as discussed above. If "no", there is a return to link 406. If "yes," the CPLD registers are reset at 412, setting bit 2 of CPLD register 6 to logic 1 and bit 4 to a logic 0. This setting places the circuit arrangement in FIG. 3A in the configuration test mode. At 414, the operating system determines whether the UART 12 input line, UART_Rx 23 is at a logic zero, indicating that there is signals coming into the UART 12. As discussed above, when the serial port 14 is short-circuited, the G-LINK circuit 10 sends back any signals it receives from the UART 12. Thus, when the operating system receives a signal it previously sent, the operating system determines that the G-LINK serial port 14 is short-circuited. If the decision block 414 returns "yes", the CPLD is again reset at 416 to place the circuit arrangement in FIG. 3A in the demonstration mode. As shown in FIG. 3B, to set the circuit arrangement in the demonstrative mode, bit 2 of register 2 is set to logic 0 and bit 4 is set to logic 1. The process then returns to link 406. If "no," the process returns to 404, setting the circuit arrangement back to either the default or the IR blaster alive mode.

Figure 5:
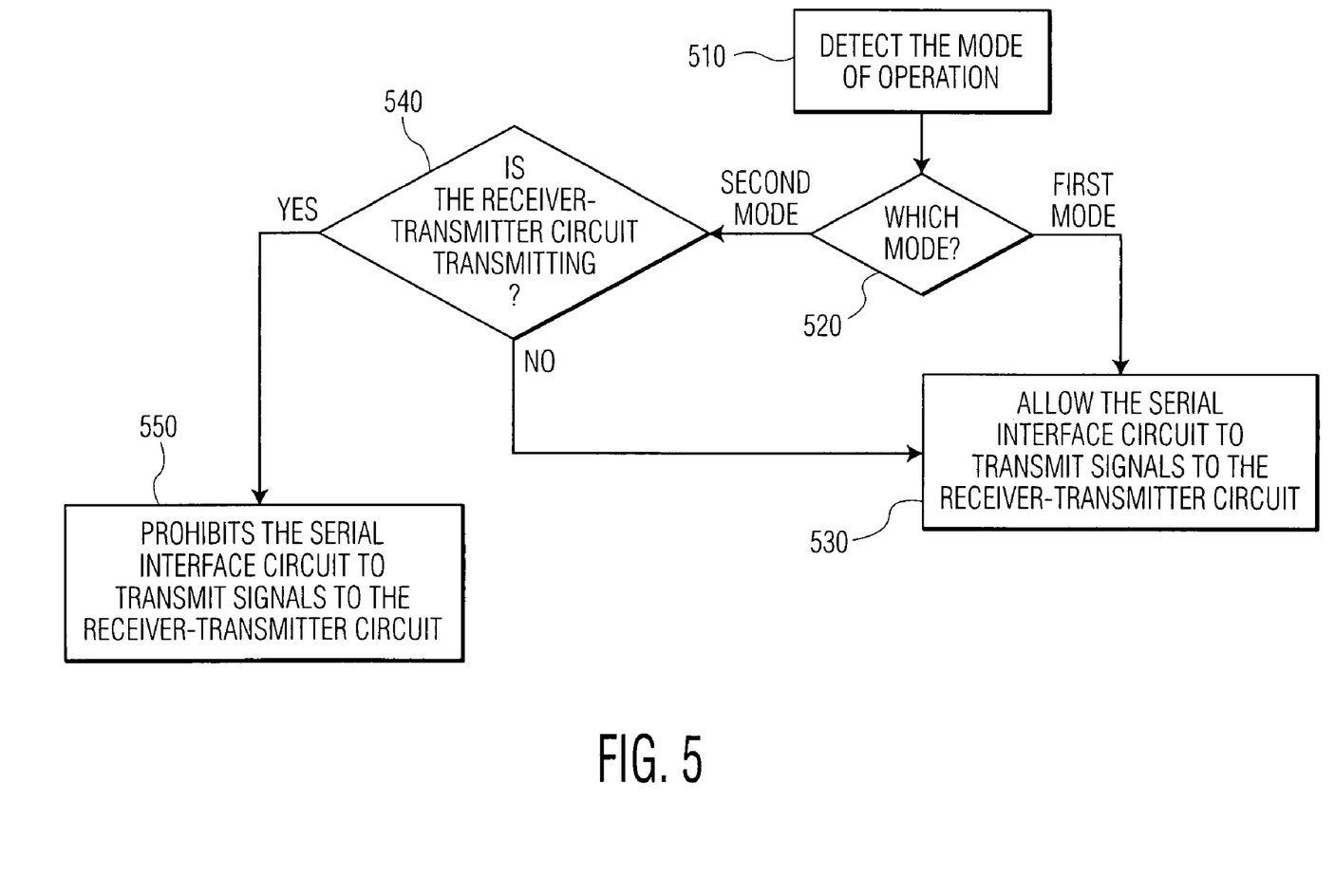
FIG. 5 illustrates a flowchart for a method for controlling transmission from a serial interface circuit to a receiver-transmitter circuit according to the mode of operation.

FIG. 5 illustrates a method for controlling transmission from a serial interface circuit such as the G-LINK circuit 10 in FIG. 2 to a receiver-transmitter circuit such as the UART 12 in FIG. 2 in a system according to the mode of operation. At 510, the mode of the operation of the system is detected. The mode is determined at 520. If the mode is a first mode such as the configuration test mode shown in FIG. 3B, allow the serial interface circuit to transmit signals to the receiver-transmitter circuit at 530. If the mode is in a second mode such as the default mode shown in FIG. 3B, determine whether the receiver-transmitter circuit is transmitting signals to the serial interface circuit at 540. If the receiver-transmitter circuit is transmitting, prohibit the serial interface circuit to transmit signals to the receiver-transmitter at 550. Otherwise, if the receiver-transmitter is not transmitting, allow the serial interface circuit to transmit signals to the receiver-transmitter circuit. As shown in FIG. 3A, the serial interface circuit may also include a bidirectional line for interfacing with a serial port (such as the G-LINK serial port 14).

The examples given herein are presented to enable those skilled in the art to more clearly understand and practice the instant invention. The examples should not be considered as limitations upon the scope of the invention, but as merely being illustrative and representative of the use of the invention. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims is reserved.

The invention claimed is:

1. A circuit arrangement comprising:
   a first circuit having an output line and an input line;
   a second circuit having an input line for receiving signals from the output line of the first circuit, and an output line for transmitting signals to the input line of the first circuit;

a control circuit having input lines for receiving the signals from the output lines of the first and second circuits, the control circuit inhibiting the signals transmitted from the output line of the second circuit to the input line of the first circuit when the first circuit is transmitting signals to the input line of the second circuit and thereby preventing the second circuit from re-transmitting the signals received from the first circuit back to the first circuit and further preventing the first circuit from generating an interrupt signal; and wherein the circuit arrangement is included in a television receiver.

2. The circuit arrangement of claim 1, wherein the control circuit keeps the input line of the first circuit at a high state when the first circuit is transmitting signals to the input line of the second circuit.

3. The circuit arrangement of claim 1 wherein the first circuit is a selected one of a Universal Asynchronous Receiver/Transmitter (UART) and a Universal Synchronous/Asynchronous Receiver/Transmitter (USART).

4. The circuit arrangement of claim 3, wherein the second circuit is a G-Link circuit.

5. The circuit arrangement of claim 1, wherein the second circuit further comprises a bi-directional line.

6. The circuit arrangement of claim 5, wherein short-circuiting the bi-directional line initiates a demonstration mode.

7. The circuit arrangement of claim 6 wherein the shorting circuiting is a short circuit to ground.

8. The circuit arrangement of claim 1 wherein the control circuit inhibits the signals transmitted from the output line of the second circuit to the input line of the first circuit when the first circuit is transmitting signals to the input line of the second circuit during a first mode of operation and allows the second circuit to transmit signals to the first circuit during a second mode of operation.

9. The circuit arrangement of claim 1, wherein signals transmitted from the output line of the first circuit control an external pager module through the second circuit for connecting to a pager service.

10. The circuit arrangement of claim 1, wherein the second circuit further comprises a second input line for receiving IR signals transmitted from an IR source and a second output line for transmitting the IR signals for remotely controlling an external device.

11. The circuit arrangement of claim 1, wherein the second circuit provides feedback between the output line of the first circuit and the input line of the first circuit.

12. The circuit arrangement of claim 1 wherein the control circuit inhibits the signals transmitted from the output line of the second circuit to the input line of the first circuit according to a mode of operation.

13. a method for controlling communication from a serial interface circuit to a receiver-transmitter circuit in a system under control of a CPU and an operating system, the method comprising the steps of: detecting a mode of operation of the system; when the mode is a first mode, allowing the serial interface circuit to transmit signals to the receiver-transmitter circuit wherein the serial interface circuit corn rises a bi-directional line; and when the mode is a second mode, detecting whether the receiver-transmitter circuit is transmitting signals to the serial interface circuit, and when the receiver-transmitter circuit is transmitting signals to the serial interface circuit, prohibiting the serial interface circuit from re-transmitting the signals received from the receiver-transmitter circuit back to the receiver-transmitter circuit and thereby preventing the receiver-transmitter circuit from generating an interrupt signal; and wherein the method is performed in a television receiver.

14. The method of claim 13 wherein the receiver-transmitter circuit is a selected one of a Universal Asynchronous Receiver/Transmitter (UART) and a Universal Synchronous/Asynchronous Receiver/Transmitter (USART).

15. The method of claim 13, wherein the serial interface circuit is a G-Link circuit.

16. The method of claim 13, wherein short-circuiting the bi-directional line initiates a demonstration mode.

17. the method of claim 16, wherein the shorting circuiting is a short circuit to ground.

18. a circuit arrangement comprising: a first circuit having an output line and an input line; a second circuit having an input line for receiving signals from the output line of the first circuit, and an output line for transmitting signals to the input line of the first circuit, the second circuit further comprising a bi-directional line; and a control circuit having input lines for receiving the signals from the output lines of the first and second circuits, the control circuit inhibiting the signals transmitted from the output line of the second circuit to the input line of the first circuit when the first circuit is transmitting signals to the input line of the second circuit and thereby preventing the second circuit from re-transmitting the signals received from the first circuit back to the first circuit and further preventing the first circuit from generating an interrupt signal; and wherein the circuit arrangement is included in a television receiver.

19. The circuit arrangement of claim 18, wherein short-circuiting the bi-directional line Initiates a demonstration mode.

20. The circuit arrangement of claim 18, wherein the first circuit is one of a Universal Asynchronous Receiver/Transmitter (UART) and a Universal Synchronous/Asynchronous Receiver/Transmitter (USART).

* * * * *